UNITED STATES PATENT OFFICE.

KARL HOCK, OF ASCHAFFENBURG, GERMANY, ASSIGNOR TO THE FARBENFABRIKEN OF ELBERFELD COMPANY, OF NEW YORK.

PHARMACEUTICAL COMPOUND AND PROCESS OF MAKING SAME.

SPECIFICATION forming part of Letters Patent No. 607,172, dated July 12, 1898.

Application filed November 4, 1897. Serial No. 657,373. (Specimens.) Patented in Germany December 6, 1896, No. 95,186.

*To all whom it may concern:*

Be it known that I, KARL HOCK, doctor of philosophy, residing at Aschaffenburg, Germany, (assignor to the FARBENFABRIKEN OF ELBERFELD COMPANY, of New York,) have invented a new and useful Improvement in Pharmaceutical Compounds, (for which German Patent No. 95,186, dated December 6, 1896, has already been obtained;) and I hereby declare the following to be a clear and exact description of my invention.

My invention relates to the production of a new condensation product of hexamethylenetetramin and tannin.

I have found that on mixing a watery solution of one molecule of hexamethylenetetramin and three molecules of tannin a precipitate is obtained representing a condensation product which contains one molecule of hexamethylenetetramin on three molecules of tannin and that this condensation product can by a subsequent treatment be transformed into a valuable medicinal compound. The said condensation product is also obtained if less than three molecules of tannin are used—for instance, if the two ingredients are allowed to act on each other in equimolecular proportions. If, however, more than three molecules of tannin are employed on one molecule of hexamethylenetetramin, the said condensation product is no longer obtained in a pure state, but mixed with another condensation product which contains six molecules of tannin on one molecule of hexamethylenetetramin.

My new product, hereinbefore defined, is soluble in water with comparative readiness. Therefore it is necessary to employ concentrated solutions of the two ingredients in order to get the reaction product precipitated. It is of an astringent taste, and therefore it cannot be employed for medicinal purposes. It can, however, according to my researches, easily be transformed into a tasteless insoluble compound which melts with difficulty if it be heated for a short time, either alone or in the presence of an indifferent liquid, at about 100° centigrade. When treated in this manner, it represents a valuble internal astringent, as it contains a large percentage of tannin. The approximate dose for its administration is one to three grams daily.

In carrying out my new process practically I can proceed as follows: A cold solution of 3.2 kilos, by weight, of tannin in twenty liters of water, is added, while being stirred, to a cold solution of 1.4 kilos, by weight, of hexamethylenetetramin in twenty liters of water. An amorphous white precipitate at once separates, which after the mixture has been stirred for some time is filtered and pressed. The dry mass thus obtained represents the soluble condensation product of one molecule of hexamethylenetetramin with three molecules of tannin.

For the purpose of rendering this product insoluble and tasteless several methods can be adopted. One of these methods is to heat the aforesaid dry mass, previously minced, in a porcelain pan. At first the product melts, and the resulting liquid is well stirred. Heating is continued for from one-half to one hour at from 90° to 100° centigrade. The liquid thus becomes stiffer and stiffer and is finally changed into a hard lump, which can be ground.

The same result is obtained if a concentrated watery solution of the above-described white precipitate is heated for a while, the liquid becoming gradually cloudy and finally separating in a resin-like mass, which after further heating changes into a hard lump. Another method to render the soluble compound insoluble is to heat its solution in glycerin for a quarter of an hour at about 110° centigrade. On pouring this solution into water a light-brown amorphous precipitate separates, which is the insoluble and tasteless compound. The same amorphous precipitate can be obtained if the above-given quantities of the two ingredients are dissolved in glycerin and the mixture of these solutions is heated, say, for a quarter of an hour at about 105° centigrade. On subsequently pouring this mixture into water the amorphous compound is obtained. Thus the formation of the soluble compound and its transformation into the insoluble body can be effected in one operation. The light-brown powder thus obtained may be purified, if desired, by washing with hot water and subsequently drying at from 90° to 100° centigrade.

The insoluble compound obtained in any of the above-described manners is a tasteless and odorless powder of yellowish-brown color, insoluble in water, alcohol, and ether. It contains about five per cent. of nitrogen, which percentage corresponds with that of the condensation product formed from one molecule of hexamethylenetetramin and three molecules of tannin.

Instead of using hexamethylenetetramin in the present process mixtures of the corresponding quantities of formic aldehyde and ammonia (which, it is well known, form hexamethylenetetramin when mixed) can be used with the same result.

Having now described my invention and in what manner the same is to be performed, what I claim as new, and desire to secure by Letters Patent, is—

1. The process for the production of a new insoluble condensation product from hexamethylenetetramin and tannin by causing solutions of hexamethylenetetramin to act on solutions of tannin and rendering the resulting condensation product insoluble and tasteless, substantially as hereinbefore described.

2. The process for the production of a new insoluble condensation product from hexamethylenetetramin and tannin, consisting in treating a cold concentrated solution of one molecule of hexamethylenetetramin with a cold concentrated solution of three molecules of tannin, separating the thus-produced amorphous white precipitate by filtration and pressing, and finally rendering this precipitate insoluble and tasteless by heating it in a porcelain pan until it forms a hard lump which can be ground, substantially as described.

3. As a new article of manufacture the new condensation product from one molecule of hexamethylenetetramin and three molecules of tannin, being an odorless and tasteless powder of a yellowish-brown color, insoluble in water, alcohol, and ether, substantially as described.

In testimony whereof I have signed my name in the presence of two subscribing witnesses.

KARL HOCK.

Witnesses:
DEAN B. MASON,
JEAN GRUND.